(12) United States Patent
Zhong

(10) Patent No.: US 12,327,856 B2
(45) Date of Patent: Jun. 10, 2025

(54) DRY ELECTRODE MANUFACTURE FOR SOLID STATE ENERGY STORAGE DEVICES

(71) Applicant: LiCAP Technologies, Inc., Sacramento, CA (US)

(72) Inventor: Linda Zhong, Sacramento, CA (US)

(73) Assignee: LICAP TECHNOLOGIES, INC., Sacramento, CA (US)

( * ) Notice: Subject to any disclaimer, the term of this patent is extended or adjusted under 35 U.S.C. 154(b) by 559 days.

(21) Appl. No.: 17/492,458

(22) Filed: Oct. 1, 2021

(65) Prior Publication Data
US 2023/0108113 A1 Apr. 6, 2023

(51) Int. Cl.
*H01M 4/04* (2006.01)
*H01M 10/0562* (2010.01)

(52) U.S. Cl.
CPC ..... *H01M 4/0435* (2013.01); *H01M 10/0562* (2013.01); *H01M 2300/0077* (2013.01)

(58) Field of Classification Search
None
See application file for complete search history.

(56) References Cited

U.S. PATENT DOCUMENTS

| | | | |
|---|---|---|---|
| 6,061,036 A * | 5/2000 | MacDonald, Jr. | H01Q 1/40 343/702 |
| 6,086,790 A | 7/2000 | Hayashi et al. | |
| 6,667,000 B1 | 12/2003 | Nakazato et al. | |
| 7,090,946 B2 | 8/2006 | Mitchell et al. | |
| 7,102,877 B2 | 9/2006 | Mitchell et al. | |

(Continued)

FOREIGN PATENT DOCUMENTS

| CN | 1509481 A | 6/2004 |
|---|---|---|
| CN | 101313377 A | 11/2008 |

(Continued)

OTHER PUBLICATIONS

Li, K., & Matsuba, G. (2019). Effects of shear temperature-controlled entanglement network on the structure evolution of Poly (ethylene oxide) in shear flow. Polymer, 171, 8-14. (Year: 2019).*

(Continued)

*Primary Examiner* — Jonathan G Leong
*Assistant Examiner* — Claire A Rutiser
(74) *Attorney, Agent, or Firm* — Stetina Garred Brucker & Newboles

(57) ABSTRACT

A method of manufacturing an electrode block for a solid-state battery includes providing an electrode film with a current collector on a first side of the electrode film, coating a layer of dry electrolyte powder on a second side of the electrode film opposite the first side, and pressing the dry electrolyte powder coated on the electrode film to produce a solid electrolyte layer on the electrode film. A method of manufacturing an electrolyte film for a solid-state battery includes preparing a powder mixture including at least one type of fibrillizable binder and at least one type of dry electrolyte powder, the at least one type of dry electrolyte powder being 80-97% of the powder mixture by weight, fibrillizing the at least one type of fibrillizable binder in the powder mixture by subjecting the powder mixture to a shear force, and pressing the powder mixture into a free-standing film.

12 Claims, 3 Drawing Sheets

(56) References Cited

U.S. PATENT DOCUMENTS

| | | |
|---|---|---|
| 7,295,432 B2 | 11/2007 | Xu |
| 7,352,558 B2 | 4/2008 | Zhong et al. |
| 7,492,571 B2 | 2/2009 | Zhong et al. |
| 7,495,349 B2 | 2/2009 | Mitchell et al. |
| 7,508,651 B2 | 3/2009 | Mitchell et al. |
| 7,791,860 B2 | 9/2010 | Mitchell et al. |
| 7,791,861 B2 | 9/2010 | Zhong et al. |
| 7,935,155 B2 | 5/2011 | Mitchell et al. |
| 8,072,734 B2 | 12/2011 | Zhong et al. |
| 8,213,156 B2 | 7/2012 | Mitchell et al. |
| 10,741,843 B2 | 8/2020 | Duong et al. |
| 2004/0086774 A1 | 5/2004 | Munoz et al. |
| 2004/0164440 A1 | 8/2004 | Ozaki et al. |
| 2005/0250011 A1 | 11/2005 | Mitchell et al. |
| 2005/0266298 A1 | 12/2005 | Mitchell et al. |
| 2005/0271798 A1 | 12/2005 | Zhong et al. |
| 2006/0078798 A1 | 4/2006 | van Heuveln et al. |
| 2008/0089006 A1 | 4/2008 | Zhong et al. |
| 2008/0110820 A1* | 5/2008 | Knipmeyer ............. C02F 1/003 210/477 |
| 2008/0201925 A1 | 8/2008 | Zhong et al. |
| 2009/0223630 A1 | 9/2009 | Mitchell et al. |
| 2009/0290288 A1 | 11/2009 | Mitchell et al. |
| 2009/0294081 A1 | 12/2009 | Gadkaree et al. |
| 2009/0321678 A1 | 12/2009 | Zhong et al. |
| 2010/0014215 A1 | 1/2010 | Zhong et al. |
| 2010/0166582 A1* | 7/2010 | Racicot ................ F16J 15/3276 277/650 |
| 2011/0287305 A1 | 11/2011 | Scordilis-Kelley et al. |
| 2013/0255872 A1* | 10/2013 | Zhong .................... H01M 4/04 156/242 |
| 2013/0266859 A1* | 10/2013 | Todoriki ............. H01M 4/5825 429/211 |
| 2017/0214051 A1* | 7/2017 | Yoon ................. H01M 10/0525 |
| 2018/0175366 A1 | 6/2018 | Zheng et al. |
| 2020/0028156 A1* | 1/2020 | Zhang ................. H01M 10/052 |
| 2020/0152987 A1 | 5/2020 | Mitchell et al. |
| 2020/0220151 A1 | 7/2020 | Reinsch et al. |
| 2020/0313191 A1 | 10/2020 | Wixom et al. |
| 2020/0388822 A1 | 12/2020 | Zhong et al. |
| 2021/0126282 A1 | 4/2021 | Ose et al. |
| 2021/0273290 A1* | 9/2021 | Bauer .................. H01M 4/0411 |
| 2023/0273061 A1 | 8/2023 | Hackfort et al. |

FOREIGN PATENT DOCUMENTS

| | | | |
|---|---|---|---|
| CN | 102324317 | A | 1/2012 |
| CN | 105381723 | A * | 3/2016 |
| DE | 102017208220 | A1 | 11/2018 |
| EP | 1923895 | A1 | 5/2008 |
| EP | 2082407 | B1 | 11/2015 |
| GB | 1421514 | | 1/1974 |
| GB | 1421514 | A | 1/1976 |
| JP | 3793751 | B2 | 7/2006 |
| JP | 2017517862 | A | 6/2017 |
| JP | 2017532737 | A | 11/2017 |
| JP | 2020196887 | A | 12/2020 |
| JP | 2021119484 | A | 8/2021 |
| JP | 2021519495 | A | 8/2021 |
| KR | 1020180102390 | A | 9/2018 |
| UA | 83075 | C2 | 6/2008 |
| WO | 2023078488 | A1 | 5/2023 |

OTHER PUBLICATIONS

Langhorn et al, 2016 "Appreciate the Art of High Viscosity Mixing" downloaded from https://www.chemicalprocessing.com/processing-equipment/fluid-handling/article/11326162/process-engineering-appreciate-the-art-of-high-viscosity-mixing-chemical-processing (Year: 2016).*
CN105381723A (Luan) Translation to English from Espacenet (Year: 2016).*
PCT Search Report and Written Opinion for PCT/US2022/044388 mailed Feb. 7, 2023.
International Search Report dated May 3, 2013 for PCT/US2013/028220 (6 pages).
Extended European Search Report for Application No. 13767354.7 dated Nov. 18, 2015 (11 pages).
European Search Report for EP20176071; mailed Oct. 13, 2020.
Decision for Grant of JP Application No. 2021-119484; mailed Nov. 9, 2021.

* cited by examiner

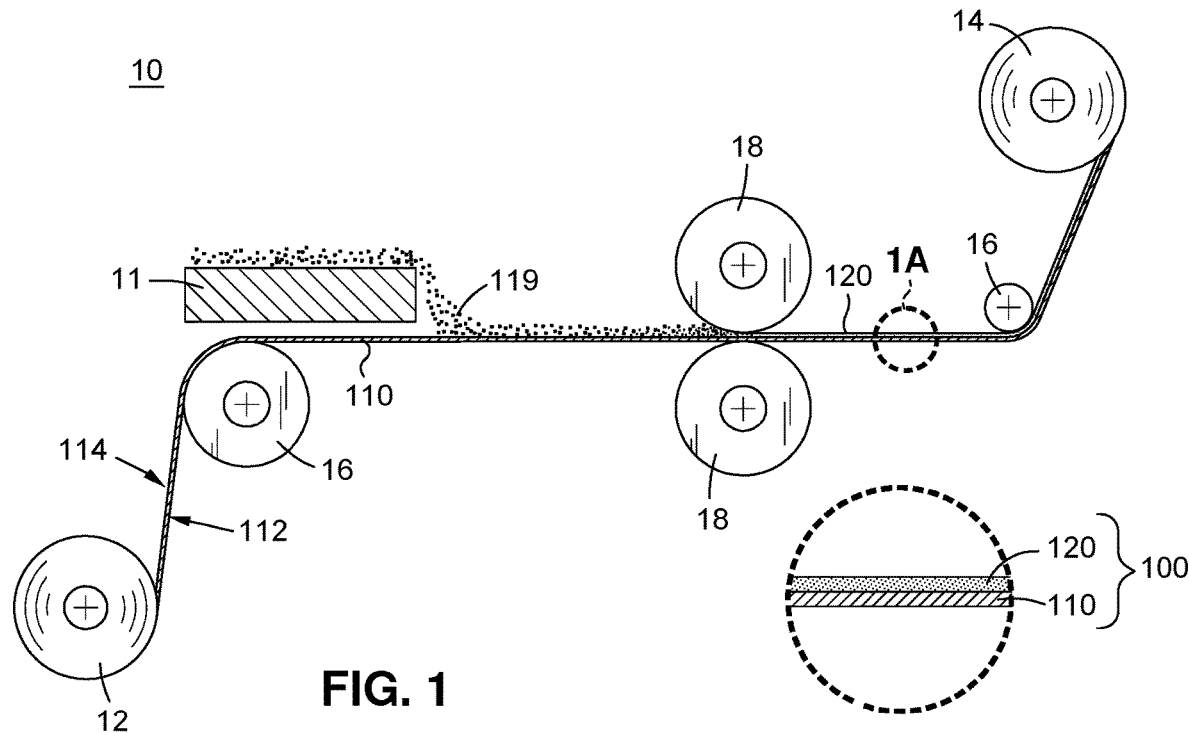
FIG. 1
FIG. 1A
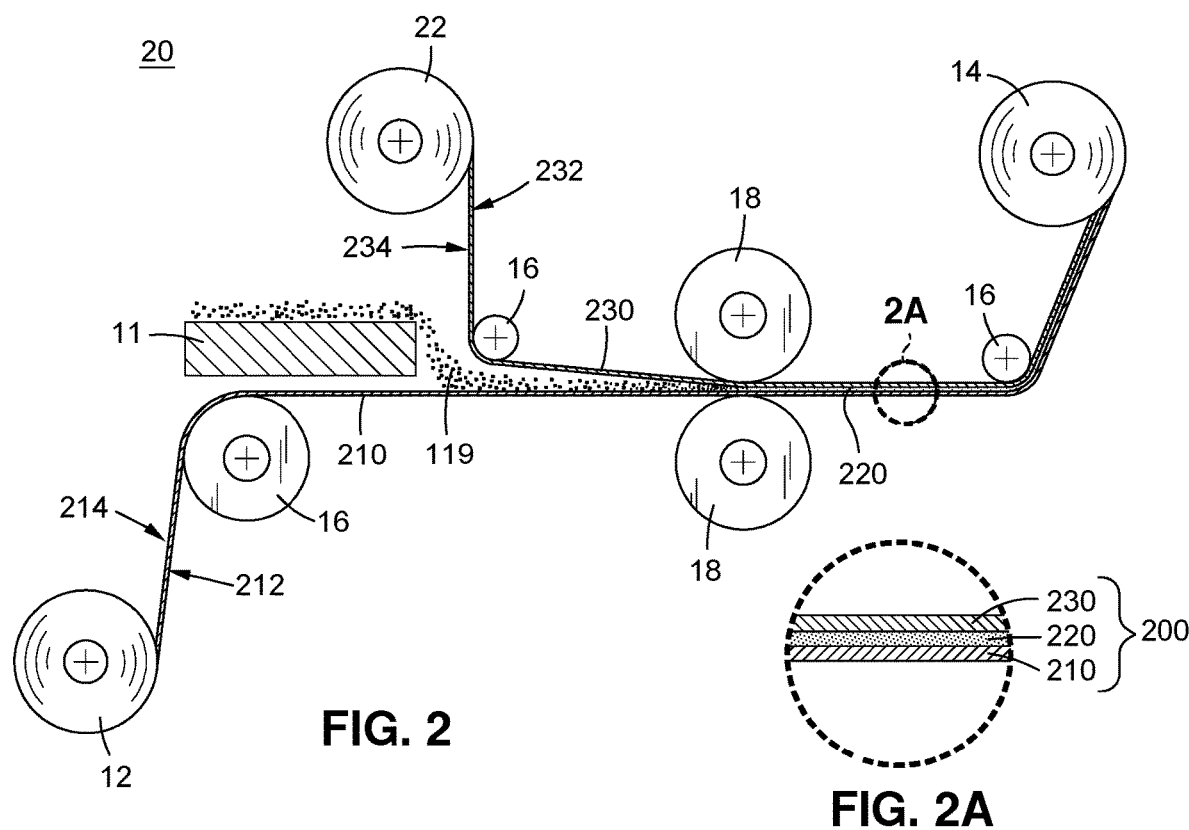
FIG. 2
FIG. 2A

DRY ELECTRODE MANUFACTURE FOR SOLID STATE ENERGY STORAGE DEVICES

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to manufacturing energy storage devices such as Li-ion batteries and, more particularly, to dry processes for the manufacture of solid-state batteries.

2. Related Art

Because of safety concerns surrounding the use of flammable liquid electrolyte in Li-ion batteries and other energy storage devices, and in order to take advantage of the high energy density attainable using a Li metal anode, there is great interest in the development of solid-state batteries and other energy storage devices. In a solid-state battery, the conventional liquid electrolyte and separator are replaced by a ceramic or solid polymer electrolyte. Unfortunately, the electrolyte materials tend to be sensitive to the N-Methylpyrrolidone (NMP) or other solvent used to form the solid electrolyte film by using wet coating method, resulting in degraded battery performance. Moreover, the current techniques for assembling solid-state batteries result in substantial boundary layers between the solid electrolyte and the electrodes, making it difficult for the electrolyte ions to pass through and thus increasing battery resistance.

BRIEF SUMMARY

The present disclosure contemplates various methods and devices for overcoming the above drawbacks accompanying the related art. One aspect of the embodiments of the present disclosure is a method of manufacturing an electrode block for a solid-state battery. The method may comprise providing an electrode film with a current collector on a first side of the electrode film, coating a layer of dry electrolyte powder on a second side of the electrode film opposite the first side, and pressing the dry electrolyte powder coated on the electrode film to produce a solid electrolyte layer on the electrode film.

Providing the electrode film with the current collector may comprise preparing a powder mixture including at least one type of electrode active material and at least one type of fibrillizable binder, fibrillizing the at least one type of fibrillizable binder in the powder mixture by subjecting the powder mixture to a shear force, pressing the powder mixture into a free-standing film, and laminating the free-standing film on the current collector. The powder mixture may further include at least one type of dry electrolyte powder.

Another aspect of the embodiments of the present disclosure is a method of manufacturing a solid-state battery. The method may comprise providing a first electrode film having a first side and a second side opposite the first side, providing a second electrode film having a first side and a second side opposite the first side, coating the second side of the first electrode film with a layer of dry electrolyte powder, placing the second side of the second electrode film on the layer of dry electrolyte powder, and pressing the first electrode film having the layer of dry electrolyte powder coated thereon together with the second electrode film to produce a solid-state battery including the first electrode film, the second electrode film, and a solid electrolyte layer therebetween.

Either one or both of providing the first electrode film and providing the second electrode film may comprise preparing a powder mixture including at least one type of electrode active material and at least one type of fibrillizable binder, fibrillizing the at least one type of fibrillizable binder in the powder mixture by subjecting the powder mixture to a shear force, and pressing the powder mixture into a free-standing film. The powder mixture may further include at least one type of dry electrolyte powder.

The method may comprise laminating the first electrode film on a first current collector with the first current collector being on the first side of the first electrode film and laminating the second electrode film on a second current collector with the second current collector being on the first side of the second electrode film. The laminating of the first electrode film and the laminating of the second electrode film may be performed prior to the coating or after the pressing.

Another aspect of the embodiments of the present disclosure is a method of manufacturing an electrode film for a solid-state battery. The method may comprise preparing a powder mixture including at least one type of electrode active material, at least one type of fibrillizable binder, and at least one type of dry electrolyte powder, the at least one type of dry electrolyte powder being 5-30% of the powder mixture by weight, fibrillizing the at least one type of fibrillizable binder in the powder mixture by subjecting the powder mixture to a shear force, and pressing the powder mixture into a free-standing film.

The method may comprise, prior to the fibrillizing, adding a solvent to the powder mixture to activate the at least one type of fibrillizable binder.

The method may comprise, prior to the fibrillizing, heating the powder mixture to 70° C. or higher to activate the at least one type of fibrillizable binder.

The powder mixture may include an additive solution including a polymer additive and a liquid carrier, the additive solution being less than 5% by weight of the powder mixture.

The powder mixture may include a conductive paste including a polymer additive, a liquid carrier, and a conductive material, the conductive paste being less than 5% by weight of the powder mixture.

Another aspect of the embodiments of the present disclosure is a free-standing electrode film. The free-standing electrode film may comprise at least one type of electrode active material, at least one type of fibrillizable binder, and at least one type of dry electrolyte powder in an amount 5-30% of the free-standing electrode film by weight.

Another aspect of the embodiments of the present disclosure is a method of manufacturing an electrolyte film for a solid-state battery. The method may comprise preparing a powder mixture including at least one type of fibrillizable binder and at least one type of dry electrolyte powder, the at least one type of dry electrolyte powder being 80-97% of the powder mixture by weight, fibrillizing the at least one type of fibrillizable binder in the powder mixture by subjecting the powder mixture to a shear force, and pressing the powder mixture into a free-standing film.

The method may comprise, prior to the fibrillizing, adding a solvent to the powder mixture to activate the at least one type of fibrillizable binder.

The method may comprise, prior to the fibrillizing, heating the powder mixture to 70° C. or higher to activate the at least one type of fibrillizable binder.

The powder mixture may include an additive solution including a polymer additive and a liquid carrier, the additive solution being less than 5% by weight of the powder mixture.

Another aspect of the embodiments of the present disclosure is a free-standing electrolyte film. The free-standing electrolyte film may comprise at least one type of fibrillizable binder and at least one type of dry electrolyte powder in an amount 80-97% of the free-standing electrolyte film.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 shows an apparatus for manufacturing an electrode block for a solid-state battery;

FIG. 1A is a close-up view showing the electrode block;

FIG. 2 shows an apparatus for manufacturing a solid-state battery;

FIG. 2A is a close-up view showing the solid-state battery;

DETAILED DESCRIPTION

Figure 3:
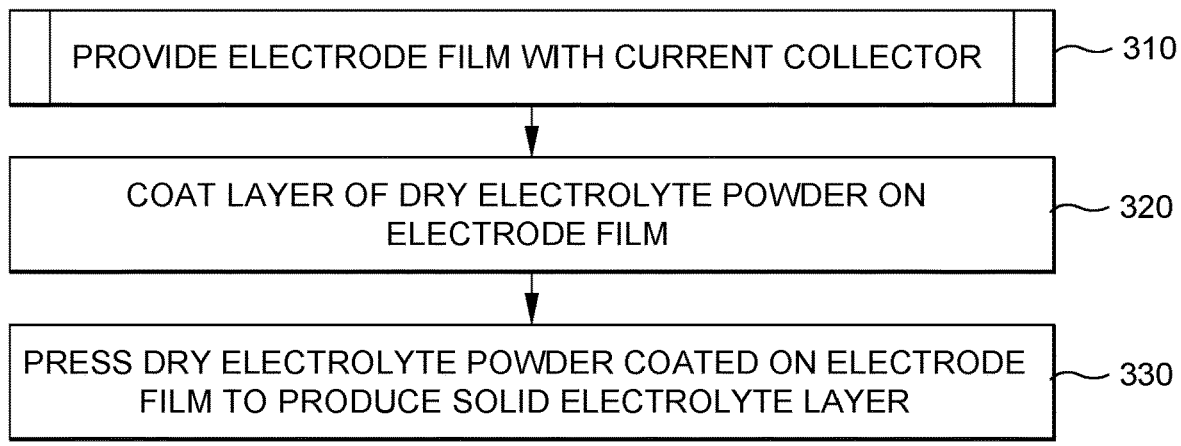
FIG. 3 is an operational flow for manufacturing an electrode block.

The present disclosure encompasses various embodiments of solid-state batteries and electrodes as well as manufacturing methods and intermediate products thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

FIG. 1 shows an apparatus 10 for manufacturing an electrode block 100 for a solid-state battery. FIG. 1A is a close-up view showing the electrode block 100, which may comprise an electrode film 110 and a solid electrolyte layer 120 laminated thereon. The electrode block 100 may be stacked and/or wound with additional electrode blocks 100 to manufacture a multi-layer battery such as a cylindrical or prismatic cell. As shown, the apparatus 10 may comprise one or more pieces of roll-to-roll processing equipment and may include, for example, a first spool 12 on which an electrode film 110 may be initially wound as a roll, a second spool 14 on which the finished electrode block 100 may be wound, and one or more rollers 16 (e.g. drive and/or idler rollers) for conveying the electrode film 110 through the apparatus 10 from the first spool 12 toward the second spool 14. Unlike conventional solid-state battery manufacturing equipment, the apparatus 10 of FIG. 1 may include a scatter coater 11 or other means for coating a layer of dry electrolyte powder 119 on one side 114 of the electrode film 110, after which the dry electrolyte powder 119 may be pressed by a roller press or calendar 18 to produce the solid electrolyte layer 120 on the electrode film 110. In this way, the solid electrolyte layer 120 may be formed in a dry process, avoiding the significant amount of NMP or other solvents used in conventional slurry-based processes, which might otherwise degrade the performance of the solid electrolyte. Moreover, because the solid electrolyte layer 120 is formed directly on the electrode film 110 rather than being subsequently stacked thereon, the resulting boundary between the electrode film 110 and the solid electrolyte layer 120 may be easier for electrolyte ions to pass through, reducing battery resistance.

The electrode film 110 may be either a cathode film or an anode film and may include an active material layer suitable for a cathode or anode, respectively. To assemble a multi-layer battery, electrode blocks 100 having cathode and anode electrode films 110 may typically be stacked in an alternating fashion, such that a solid electrolyte layer 120 separates each cathode from an adjacent anode and each anode from an adjacent cathode. For ease of illustration, the electrode film 110 is illustrated as having only a single layer, namely the active material layer (which may be 50 μm to 350 μm, for example), with the dry electrolyte powder 119 being coated on one side 114 thereof. However, a current collector (which may be 8 μm to 30 μm, for example) such as an aluminum metal sheet in the case of a cathode electrode film 110 or a copper metal sheet in the case of an anode electrode film 110 may be laminated on the opposite side 112. While not separately shown, this current collector may be present for the process illustrated in FIG. 1 and may help to provide stability during pressing of the dry electrolyte powder 119 into the solid electrolyte layer 120, as well as being in the finished electrode block 100 shown in FIG. 1A. It is also contemplated, though typically less practical, that the current collector may be laminated to the electrode block 100 after the processing of FIG. 1, rather than before.

FIG. 2 shows an apparatus 20 for manufacturing a solid-state battery 200. FIG. 2A is a close-up view showing the solid-state battery 200, which may comprise a first electrode film 210, a solid electrolyte layer 220, and a second electrode film 230 in the stated order as shown. The apparatus 20 may be largely the same as the apparatus 10 of FIG. 1 and may similarly include a first spool 12 on which the first electrode film 210 may be initially wound as a roll, a second spool 14 on which the finished product, in this case a solid-state battery 200, may be wound, one or more rollers 16, roller press or calendar 18, and scatter coater 11 or other means. The apparatus 20 may differ from the apparatus 10 in the addition of a third spool 22 on which the second electrode film 230 is initially wound as a roll. In the apparatus 20, the scatter coater 11 may coat a layer of dry electrolyte powder 119 on one side 214 of the first electrode film 210, after which one side 234 of the second electrode film 230 may be placed on the layer of dry electrolyte powder 119. Using the roller press or calendar 18, the first electrode film 210 having the layer of dry electrolyte powder 119 coated thereon may then be pressed together with the second electrode film 230 to produce the solid-state battery 200 including the first electrode film 210, the second electrode film 230, and the solid electrolyte layer 220 therebetween.

Whereas the apparatus 10 shown in FIGS. 1 and 1A may produce an individual electrode block 100 for use in a multi-layer battery, the apparatus 20 of FIGS. 2 and 2A may produce a finished single-layer solid-state battery 200 having only one cathode and one anode. Such a single-layer solid-state battery 200 may be packaged as a pouch cell or button cell, for example. It should be noted that either one of the first and second electrode layers 210, 230 may be the cathode, with the other being the anode. That is, the dry electrolyte powder 119 may be coated on either the cathode or the anode prior to being sandwiched by the other and pressed to form the solid electrolyte layer 220.

Again, for ease of illustration, the electrode film 210 is illustrated as having only a single layer, namely the active material layer, with the dry electrolyte powder 119 being coated on one side 214 thereof. Similarly, the electrode film 230 is illustrated as having only the active material layer, with one side 234 being placed on the dry electrolyte powder 119. It should be understood, as above, that a current collector such as an aluminum metal sheet in the case of a cathode electrode film 210, 230 or a copper metal sheet in the case of an anode electrode film 210, 230 may be laminated on the opposite side 212, 232, which may be present for the process illustrated in FIG. 2 and in the finished solid-state battery 200 shown in FIG. 2A. However, since some single-cell batteries 200 may not have current collectors, such as a coin cell that utilizes the metal of the case for this purpose, it is contemplated that the process of FIG. 2 may realistically proceed without there being current collectors on the electrode films 210, 230. In this regard, the process of FIG. 2 may have less practical need for the metal current collector layer(s) since the additional electrode film 230 may introduce some stability during the pressing relative to the process of FIG. 1. Thus, in a case where current collectors will be used in the finished solid-state battery 200, the electrode films 210, 230 may be laminated on the respective current collectors either prior to the coating with the dry electrolyte powder 119 (and thus prior to the pressing) or after the pressing.

FIG. 3 is an operational flow for manufacturing an electrode block such as the electrode block 100 shown in FIG. 1A. The operational flow may begin with providing the electrode film 110, which may typically be laminated on a current collector as explained above (step 310). The electrode film 110 may be produced by any method, including slurry coating methods, extrusion methods, and dry methods, for example. Advantageously, a dry method may be used, such as any of the methods described in the inventor's own prior patents and patent applications, including U.S. Pat. No. 10,069,131, entitled "Electrode for Energy Storage Devices and Method of Making Same," U.S. Patent Application Pub. No. 2020/0388822, entitled "Dry Electrode Manufacture by Temperature Activation Method," U.S. patent application Ser. No. 17/014,862, entitled "Dry Electrode Manufacture with Lubricated Active Material Mixture," and U.S. patent application Ser. No. 17/097,200, entitled "Dry Electrode Manufacture with Composite Binder," the entire disclosure of each of which is wholly incorporated by reference herein. In particular, as described in more detail below, the electrode film 110 may be produced by preparing a powder mixture including at least one type of electrode active material (e.g. a lithium metal oxide in the case of a cathode or graphite in the case of an anode) and at least one type of fibrillizable binder such as polytetrafluoroethylne (PTFE), polyvinylpyrrolidone (PVP), polyvinylidene fluoride (PVDF), polyethylene oxide (PEO), or carboxymethylcellulose (CMC), fibrillizing the binder by subjecting the powder mixture to a shear force, and pressing the powder mixture into a free-standing film that may then be laminated on a current collector.

With the electrode film 110 having been produced or otherwise provided, preferably including a current collector on a first side 112 thereof, the operational flow of FIG. 3 may continue with coating a layer of dry electrolyte powder 119 on a second side 114 of the electrode film 110 opposite the first side 112 (step 320). As illustrated in FIG. 1, the coating of the dry electrolyte powder 119 on the electrode film 110 may be part of a roll-to-roll process as exemplified by the apparatus 10, in which a scatter coater 11 coats the dry electrolyte powder 119 on the electrode film 110 as the electrode film 110 is conveyed from a first spool 12 to a second spool 14 by one or more rollers 16. The operational flow may conclude with pressing the dry electrolyte powder 119 coated on the electrode film 110 to produce a solid electrolyte layer 120 on the electrode film 110 (step 330). As shown in FIG. 1, for example, a roller press or calendar 18 may press the dry electrolyte powder 119 on the electrode film 110 to produce the solid electrolyte layer 120 as the dry electrode film 110 passes through the apparatus 10 from the first spool 12 to the second spool 14. The completed electrode block 100, which may be used to produce a multi-layer battery as described above, may be as illustrated in FIG. 1A (with the current collector omitted for ease of illustration).

Figure 4:
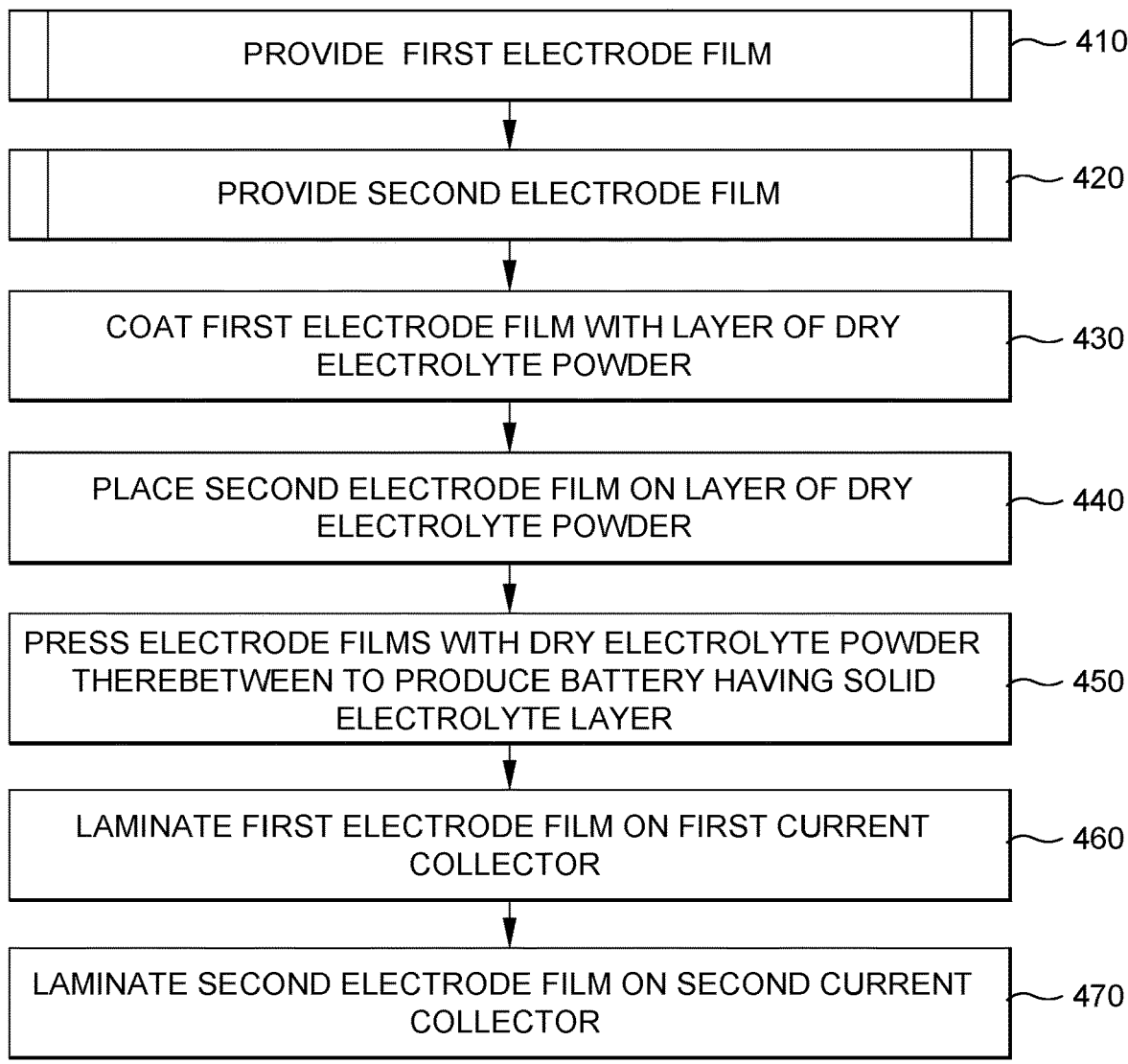
FIG. 4 is an operational flow for manufacturing a solid-state battery.

FIG. 4 is an operational flow for manufacturing a solid-state battery such as the solid-state battery 200 shown in FIG. 2A. The operational flow may begin with providing the first electrode film 210 and the second electrode film 230 (steps 410 and 420). Like the electrode film 110 described above, the electrode films 210, 230 may be produced by any method, including slurry coating methods, extrusion methods, and dry methods, for example, including any of the methods described in the inventor's own prior patents and patent applications, such as those incorporated by reference above. In particular, as described in more detail below, each of the electrode films 210, 230 may be produced by preparing a powder mixture including at least one type of electrode active material (e.g. a lithium metal oxide in the case of a cathode or graphite in the case of an anode) and at least one type of fibrillizable binder such as PTFE, PVP, PVDF, PEO, or CMC, fibrillizing the binder by subjecting the powder mixture to a shear force, and pressing the powder mixture into a free-standing film that may then be laminated on a current collector. In a case where the first electrode film 210 is made of a cathode active material, the second electrode film 230 may be made of an anode active material. In a case where the first electrode film 210 is made of an anode active material, the second electrode film 230 may be made of a cathode active material.

With the electrode films 210, 230 having been produced or otherwise provided, optionally including respective current collectors on first sides 212, 232 thereof, the operational flow of FIG. 4 may continue with coating a layer of dry electrolyte powder 119 on a second side 214 of the first electrode film 310 opposite the first side 212 (step 430). As illustrated in FIG. 2, the coating of the dry electrolyte powder 119 on the electrode film 210 may be part of a roll-to-roll process as exemplified by the apparatus 20, in which a scatter coater 11 coats the dry electrolyte powder 119 on the first electrode film 210 (which may be either the cathode of the anode) as the first electrode film 210 is conveyed from a first spool 12 to a second spool 14 by one or more rollers 16. After the dry electrolyte powder 119 is coated on the first electrode film 210, the operational flow may continue with placing the second electrode film 230 on the layer of dry electrolyte powder 119. In particular, a second side 234 of the second electrode film 230 (i.e. the side opposite the first side 232 having the optional current collector) may be brought near the layer of dry electrolyte powder 119 as shown in FIG. 2 such that the first and second electrode films 210, 230 sandwich the layer of dry electrolyte powder 119. The operational flow may continue with pressing (e.g. using a roller press or calendar 18) the first electrode film 210 having the layer of dry electrolyte powder 119 coated thereon together with the second electrode film 230 to produce a solid-state battery 200 including the first electrode film 210, the second electrode film 230, and a solid electrolyte layer 220 therebetween (step 450). The completed solid-state battery 200, which may be a single-layer battery as described above, may be as illustrated in FIG. 2A.

The operational flow of FIG. 4 may conclude with laminating the first electrode film 210 on a first current collector (e.g. an aluminum metal sheet in the case of a cathode or a copper metal sheet in the case of an anode) and, likewise, laminating the second electrode film 230 on a second current collector (steps 460, 470). These steps may follow step 450 as shown in FIG. 4, with the completed solid-state battery 200 being subsequently laminated to respective current collectors on both outer sides 212, 232. Alternatively, one or both of steps 460 and 470 may precede step 430, such that the electrode films 210, 230 are laminated to respective current collectors prior to coating with the dry electrolyte powder 119 as described above. In this case, FIG. 2A omits such optional current collectors for ese of illustration. Alternatively, steps 460 and 470 may be omitted altogether, as may be useful in the case of manufacturing certain button cells that do not use current collectors.

The dry electrolyte powder 119 used in either of the operational flows of FIGS. 3 and 4 (and by either of the apparatuses 10, 20) may be primarily (e.g. 80-100% by weight) a ceramic such as a garnet-structure oxide, for example, lithium lanthanum zirconium oxide (LLZO) with various dopants (e.g. $Li_{6.5}La_3Zr_2O_{12}$ or $Li_7La_3Zr_2O_{12}$), lithium lanthanum zirconium tantalum oxide (LLZTO) (e.g. $Li_{6.4}La_3Z_{1.4}Ta_{0.6}O_{12}$), lithium lanthanum zirconium niobium oxide (LLZNbO) (e.g. $Li_{6.5}La_3Zr_{1.5}Nb_{0.5}O_{12}$), lithium lanthanum zirconium tungsten oxide (LLZWO) (e.g. $Li_{6.3}La_3Zr_{1.65}W_{0.35}O_{12}$), a perovskite-structure oxide, for example, lithium lanthanum titanate (LLTO) (e.g. $Li_{0.5}La_{0.5}TiO_3$, $Li_{0.34}La_{0.56}TiO_3$, or $Li_{0.29}La_{0.57}TiO_3$) or lithium aluminum titanium phosphate (LATP) (e.g. $Li_{1.4}Al_{0.4}Ti_{1.6}(PO_4)_3$), a lithium super ionic conductor $Li_{2+2x}Zn_{1-x}GeO_4$ (LISICON), for example, lithium aluminum titanium phosphate (LATP) (e.g. $Li_{1.3}Al_{0.3}Ti_{1.7}(PO_4)_3$), lithium aluminum germanium phosphate (LAG or sodium super ionic conductor i.e. NASICON-type LAGP) (e.g. $Li_{1.5}Al_{0.5}Ge_{1.5}(PO_4)_3$ or $Li_{1.5}Al_{0.5}Ge_{1.5}P_3O_{12}$), or a phosphate, for example, lithium titanium phosphate (LTPO) (e.g. $LiTi_2(PO_4)_3$), lithium germanium phosphate (LGPO) (e.g. $LiGe_2(PO_4)_3$), lithium phosphate (LPO) (e.g. gamma-$Li_3PO_4$ or $Li_7P_3O_{11}$), or lithium phosphorus oxynitride (LiPON). As another example, the dry electrolyte powder 119 may be primarily (e.g. 80-100% by weight) a polymer such as PEO, PEO-PTFE, PEO-LiTFSi, PEO-LiTFSi/LLZO, PEO-LiClO$_4$, PEO-LiClO$_4$/LLZO, poly(3,4-ethylenedioxythiophene) polystyrene sulfonate (PEDOT:PSS), polyphenylene oxide (PPO), polyethylene glycol (PEG), a polyether-based polymer, a polyester-based polymer, a nitril-based polymer, a polysiloxane-based polymer, polyurethane, poly-(bis((methoxyethoxy)ethoxy)phosphazene) (MEEP), or polyvinyl alcohol (PVA). As another example, the dry electrolyte powder 119 may be primarily (e.g. 80-100% by weight) a sulfide such as lithium sulfide (LS) (e.g. $Li_2S$), glassy lithium sulfide phosphorus sulfide (LSPS) (e.g. $Li_2S—P_2S_5$), glassy lithium sulfide boron sulfide (LSBS) (e.g. $Li_2S—B_2S_3$), glassy lithium sulfide silicon sulfide (LSSiS) (e.g. $Li_2S—SiS_2$), lithium germanium sulfide (LGS) (e.g. $Li_4GeS_4$), lithium phosphorus sulfide (LPS) (e.g. $Li_3PS_4$ such as $75Li_2S-25P_2S_5$ or $Li_7P_3S_{11}$ such as $70Li_2S-30P_2S_5$), lithium silicon phosphorus tin sulfide (LSPTS) (e.g. $Li_x(SiSn)P_yS_z$), argyridite $Li_6PS_5X$ (X=Cl, Br) (e.g. LPSBr such as $Li_6PS_5Br$, LPSCl such as $Li_6PS_5Cl$, LPSClBr such as $Li_6PS_5Cl_{0.5}Br_{0.5}$, or LSiPSCl such as $Li_{9.54}S_{1.74}P_{1.44}S_{11.7}Cl_{0.3}$), or thio-LISICON (e.g. LGPS such as $Li_{10}GePS_{12}$).

Figure 5:
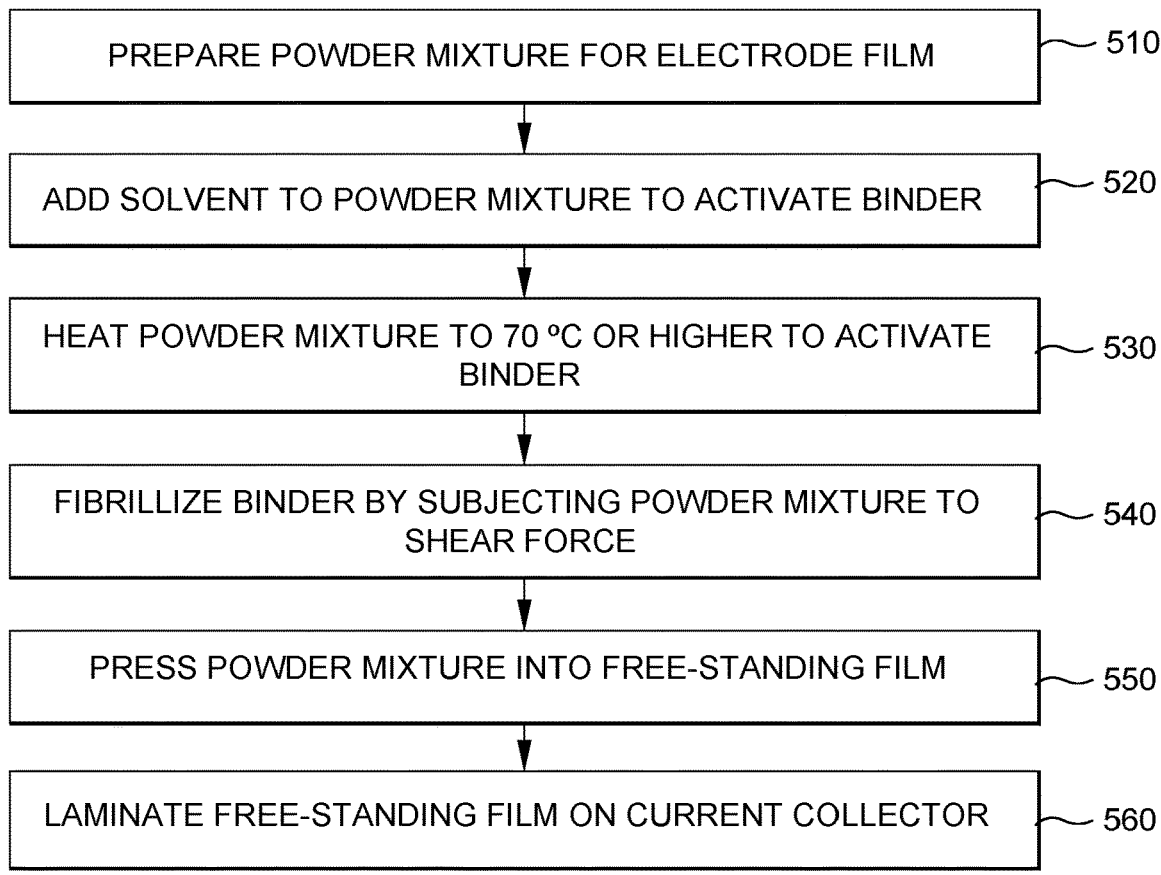
FIG. 5 is an operational flow for manufacturing an electrode film and is an example sub-operational flow of step 310 in FIG. 3, step 410 in FIG. 4, or step 420 in FIG. 4.

FIG. 5 is an operational flow for manufacturing an electrode film such as the electrode film 110, 210, 230 described above. As such, FIG. 5 may serve as an example sub-operational flow of step 310 in FIG. 3, step 410 in FIG. 4, or step 420 in FIG. 4. In particular, FIG. 5 provides an example of a dry method for producing a cathode or anode electrode film 110, 210, 230, which may in turn be used to produce an electrode block 100 of a multi-layer battery according to the operational flow of FIG. 3 or to produce a single-layer battery according to the operational flow of FIG. 4. As noted above, producing an electrode film 110, 210, 230 by a dry method may generally involve preparing a powder mixture including at least one type of electrode active material and at least one type of fibrillizable binder, fibrillizing the binder by subjecting the powder mixture to a shear force, and pressing the powder mixture into a free-standing film that may then be laminated on a current collector. More specifically, the operational flow of FIG. 5 may begin with preparing a powder mixture for the electrode film 110, 210, 230 (step 510). The electrode active material may make up the majority of the powder mixture, being 82-99% (e.g., 94%) by weight of the powder mixture, for example. For a cathode, the electrode active material may be a lithium metal oxide such as lithium manganese oxide (LMO), lithium nickel manganese cobalt oxide (NCM), lithium nickel cobalt aluminum oxide (NCA), lithium nickel manganese oxide (LMNO), etc. In the case of an anode, the electrode active material may be graphite, silicon dioxide ($SiO_2$), a mixture of the two, etc. Depending on the conductivity of the active material, a conductive material may also be added to the powder mixture in an amount 0-10% (e.g., 4%) by weight, for example. Example conductive materials may include activated carbon, a conductive carbon black such as acetylene black, Ketjen black, or super P (e.g. a carbon black sold under the trade name SUPER P® by Imerys Graphite & Carbon of Switzerland), carbon nanotubes (CNT), graphite particles, a conducting polymer, or combinations thereof.

In order to form the electrode film 110, 210, 230 by a dry method (and thus avoid the long drying times associated with conventional slurry coating and extrusion methods), the powder mixture may further include at least one type of fibrillizable binder such as polytetrafluoroethylne (PTFE), polyvinylpyrrolidone (PVP), polyvinylidene fluoride (PVDF), polyethylene oxide (PEO), or carboxymethylcellulose (CMC), including composite binders as described in U.S. patent application Ser. No. 17/097,200, entitled "Dry Electrode Manufacture with Composite Binder," incorporated by reference above. Fibrillizable binders may be characterized by their soft, pliable consistency and, in particular, by their ability to stretch, becoming longer and finer to take on a fibrous status when they undergo shear force. Owing to the use of one or more fibrillizable binders, which may further be chemically or thermally activated to increase its flexibility as described below, the powder mixture may be pressed into a free-standing film without breakage and without excessive use of solvents such as NMP.

As described in greater detail in U.S. patent application Ser. No. 17/014,862, entitled "Dry Electrode Manufacture with Lubricated Active Material Mixture," incorporated by reference above, the powder mixture containing the electrode active material may be lubricated by mixing in a polymer-containing additive solution or conductive paste prior to adding the binder. For example, the powder mixture may include, in addition to the electrode active material (and in addition to the fibrillizable binder to be subsequently added), an additive solution including a polymer additive and a liquid carrier. The additive solution may be less than 5% by weight of the powder mixture, such that the powder mixture may remain a dry powder despite the relatively small amount of liquid that is added. For example, the final powder mixture, including the electrode active material, any conductive materials, the fibrillizable binder, and the additive solution, as well as any electrolyte powder (see below), may have total solid contents greater than 95% by weight. The polymer additive, which may be 0.5%-10% by weight of the additive solution, may be a polymeric compound, surfactant or high viscosity liquid (e.g. mineral oil or wax) such as those known to be used as a dispersant for carbon nanotubes or as a binder. See, for example, U.S. Pat. No. 8,540,902, which provides example dispersants and polymeric binders including polyethylene, polypropylene, polyamide, polyurethane, polyvinyl chloride, polyvinylidene fluoride, thermoplastic polyester resin, polyvinylpyrrolidone, polystyrene sulfonate, polyphenylacetylene, polymeta-phenylenevinylene, polypyrrole, polyp-phenylene benzobisoxazole, natural polymers, amphiphilic materials in aqueous solutions, anionic aliphatic surfactant, sodium dodecyl sulfate, cyclic lipopeptido bio surfactant, water-soluble polymers, polyvinyl alcohol sodium dodecyl sulfate, polyoxyethylene surfactant, polyvinylidene fluoride (PVDF), carboxyl methyl cellulose (CMC), hydroxyl ethyl cellulose polyacrylic acid, polyvinyl chloride and combinations thereof. Another example polymer additive may be styrene-butadiene rubber (SBR). The liquid carrier used to produce the additive solution may be aqueous or non-aqueous and may, for example, include one or more chemicals selected from the group consisting of n-methylpyrrolidone, a hydrocarbon, an acetate ester, an alcohol, a glycol, ethanol, methanol, isopropanol, acetone, diethyl carbonate, and dimethyl carbonate.

Alternatively, the powder mixture may include, in addition to the electrode active material (and in addition to the fibrillizable binder to be subsequently added) a conductive paste including a polymer additive, a liquid carrier, and a conductive material. Like the additive solution described above, the conductive paste may be less than 5% by weight of the powder mixture. For example, the final powder mixture, including the electrode active material, the fibrillizable binder, and the conductive paste (typically no separate conductive material will be used in the powder mixture), as well as any electrolyte powder (see below), may have total solid contents greater than 95% by weight. The conductive paste may differ from the additive solution in the addition of a conductive material that is, for example, 1-20% by weight of the conductive paste, preferably 2-15%, more preferably 5-10%. The conductive paste may be, for example, a CNT paste conventionally used to enhance electro-conductivity in a wet mixture used in a coating method as exemplified by U.S. Pat. No. 8,540,902. As one example, the conductive paste may consist of 3.08% (by weight) PVP as the polymer additive, 91.67% NMP as the liquid carrier, and 6.25% carbon nanotube as the conductive material.

In order that the resulting electrode film 110, 210, 230 will be able to more easily exchange electrolyte ions with the solid electrolyte layer 120, 220 in the finished electrode block 100 or solid-state battery 200, thereby reducing battery resistance, the powder mixture may include at least one type of dry electrolyte powder. The amount of dry electrolyte powder in the powder mixture may be 5-30% by weight, for example. The dry electrolyte powder included in the powder mixture may be the same as or different from the dry electrolyte powder 119 used to form the solid electrolyte layer 120, 220 and may be, for example, any of the materials listed above in relation to the dry electrolyte powder 119.

With the powder mixture having been prepared, including the electrode active material, any additive solution or conductive paste for lubricating the electrode active material, the fibrillizable binder, any additional conductive material, and, advantageously, at least one type of dry electrolyte powder, the operational flow of FIG. 5 may continue with activating the fibrillizable binder by one or more activation methods. In a solvent activation step, a solvent may be added to the powder mixture to chemically activate the fibrillizable binder, causing the fibrillizable binder to soften and become able to stretch longer and finer without breaking and improving its adhesion strength (step 520). Unlike solvents such as NMP that may be difficult to remove and entail lengthy drying processes, the solvent added in the solvent activation step 520 may have a relatively low boiling point of less than 130° C. or less than 100° C. (i.e. less than the boiling point of water). Example solvents may include hydrocarbons (e.g. hexane, benzene, toluene), acetates (e.g. methyl acetate, ethyl acetate), alcohols (e.g. propanol, methanol, ethanol, isopropyl alcohol, butanol), glycols, acetone, dimethyl carbonate (DMC), diethylcarbamazine (DEC), tetrachloroethylene, etc. Unlike slurry coating and extrusion processes in which the solvent may be 60-80% by weight of the resulting wet mixture, the solvent added in step 520 may be less than 20% of the resulting mixture. For example, the ratio of the powder mixture to the added solvent may be around 100:10 or 100:5 or 100:3.

Instead of or in addition to the solvent activation of step 520, the operational flow may include a temperature activation step in which the powder mixture is heated to 70° C. or higher, preferably 100° C. or higher, to thermally activate the fibrillizable binder (step 530). Like the solvent activation step 520, the temperature activation step 530 may cause the fibrillizable binder to soften and become able to stretch longer and finer without breaking, improving its adhesion strength. In the temperature activation step 530, the temperature to which the powder mixture is heated may be less than the glass transition temperature of the binder (e.g. 114.85° C. for PTFE), as softening of the binder may occur prior to reaching the glass temperature. Alternatively, the mixture may be heated to a temperature equal to or greater than the glass temperature of the binder. In a case where both the solvent activation step 520 and the temperature activation step 530 are used, the two steps may proceed in either order.

With the fibrillizable binder having been chemically and/or thermally activated by either one or both of steps 520 and 530, the operational flow of FIG. 5 may continue with fibrillizing the binder in the powder mixture by subjecting the powder mixture to a shear force (step 540). For example, the powder mixture may be blended in an ordinary kitchen blender or an industrial blender. Adequate shear force to deform (e.g. elongate) the fibrillizable binder, resulting in a stickier, more pliable mixture, may be achieved by blending the powder mixture in a blender at around 10,000 RPM for 1-10 min (e.g. 5 min). Preferably, a high-shear mixer may be used, such as a high-shear granulator (e.g. a jet mill). If a solvent is added in a solvent activation step 520 to chemically activate the binder, the solvent may in some cases be injected into the powder mixture while the powder mixture is being subjected to the shear force in step 540. Thus, steps 520 and 540 can be performed in a single step.

After the mixture has been subjected to the shear force, the operational flow of FIG. 5 may continue with a step 550 of pressing the mixture to produce a free-standing film that will serve as the electrode film 110, 210, 230. This may be done using a roller press or calendar, for example, such as at a temperature of 150° C. and a roll gap of 20 µm. The resulting free-standing electrode film 110, 210, 230 may comprise at least one type of electrode active material, at least one type of fibrillizable binder, and at least one type of dry electrolyte powder in an amount 5-30% of the free-standing electrode film by weight. In a case where the electrode film 110, 210, 230 is to be laminated on a current collector prior to the coating of the dry electrolyte powder 119 to form the solid electrolyte layer 120, 220 (steps 320, 430), the operational flow of FIG. 5 may conclude with laminating the free-standing electrode film 110, 210, 230 on a current collector (step 560). For example, as explained above, this may be particularly advantageous when producing an electrode block 100 for a multi-layer battery according to the operational flow of FIG. 3 (i.e. when FIG. 5 is a sub-operational flow of step 310). If no current collector will be used, or if the current collector will be added later (as in the case of optional steps 460 and 470 of FIG. 4), step 560 may be omitted.

As noted above, the operational flow of FIG. 5 may advantageously be used to produce the electrode film(s) 110, 210, 230 shown in FIGS. 1 and 2, which may then be assembled into an electrode block 100 of a multi-layer solid-state battery according to the operational flow of FIG. 3 or into a single-layer solid-state battery 200 according to the operational flow of FIG. 4. To this end, the powder mixture prepared in step 510 of FIG. 5 may preferably include at least some dry electrolyte powder as noted above, making the activated dry process described herein uniquely suitable for the manufacture of solid-state batteries. By manufacturing the electrode block 100 or solid-state battery 200 by an entirely dry method from start to finish in this way, using a combination of the operational flow of FIG. 5 with that of FIG. 3 or 4, the long drying times and degraded battery performance associated with conventional wet methods may be completely avoided, resulting in more practical and efficient solid-state battery manufacture.

Figure 6:
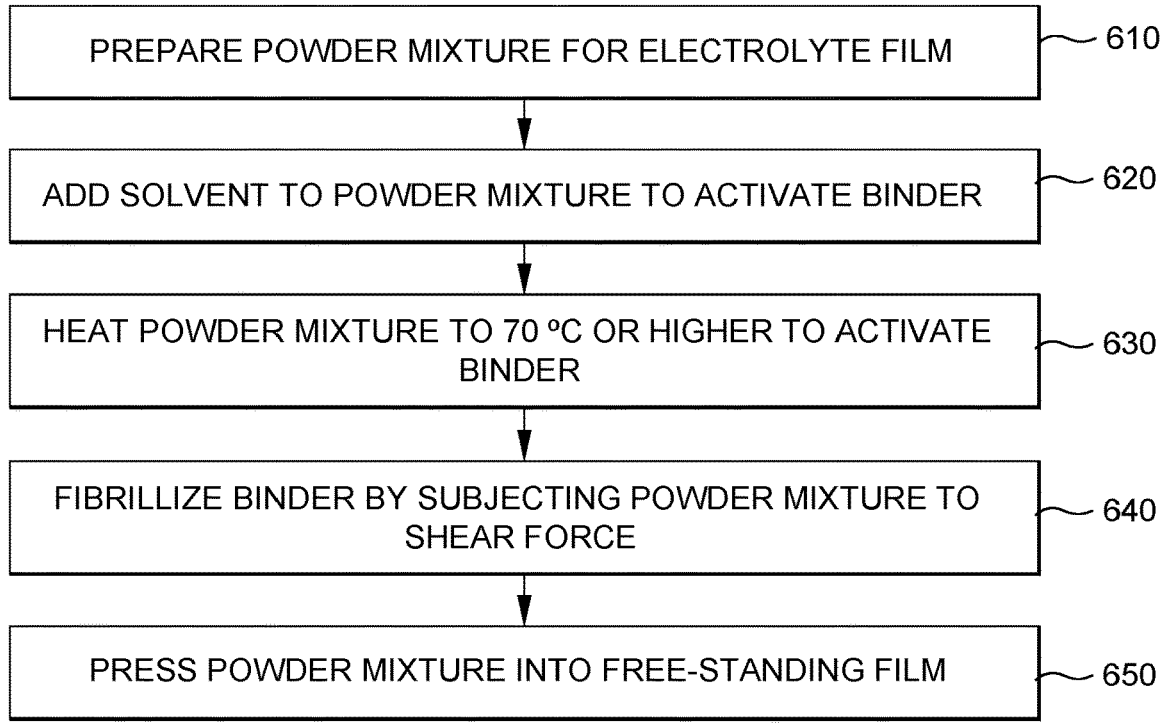
FIG. 6 is an operational flow for manufacturing an electrolyte film.

FIG. 6 is an operational flow for manufacturing an electrolyte film. The operational flow of FIG. 6 may be part of an alternative methodology for dry solid-state battery manufacture. Unlike the solid electrolyte layer 120, 220 described in relation to FIGS. 1-4, which is formed from dry electrolyte powder 119 coated directly on an electrode film 110, 210, the solid electrolyte layer produced in FIG. 6 is in the form of a free-standing film that may thereafter be laminated on an electrode film. In this regard, it should be noted that the electrode film that will receive the electrolyte film of FIG. 6 may still be produced according to the dry method of FIG. 5, thus resulting in another entirely dry process for producing a solid-state battery.

The operational flow of FIG. 6 may be considered analogous to dry methods for producing electrode films (such as the exemplary method of FIG. 5) with the major difference being that the powder mixture contains the ingredients for producing a solid electrolyte rather than a cathode or anode. In particular, the operational flow of FIG. 6 may begin with preparing a powder mixture for an electrolyte film (step 610). In this case, a dry electrolyte powder (rather than an electrode active material) may make up the majority of the powder mixture, being 80-97% by weight of the powder mixture, for example. Examples of the dry electrolyte powder may include any of those materials listed above in relation to the dry electrode powder 119. In order to form the electrolyte film by a dry method (and thus avoid the long drying times associated with conventional wet methods), the powder mixture may further include at least one type of fibrillizable binder such as PTFE, PVP, PVDF, PEO, or CMC, including composite binders as described in U.S. patent application Ser. No. 17/097,200, entitled "Dry Electrode Manufacture with Composite Binder," incorporated by reference above. As explained above, the use of one or more fibrillizable binders, which may further be chemically or thermally activated to increase its flexibility, may allow the powder mixture to be pressed into a free-standing film without breakage and without excessive use of solvents such as NMP.

Just like in the case of the powder mixtures for the electrode films 110, 210, 230, it is contemplated that the powder mixture containing the dry electrolyte powder may be lubricated by mixing in a polymer-containing additive solution prior to adding the binder. For example, the powder mixture may include, in addition to the dry electrolyte powder (and in addition to the fibrillizable binder to be subsequently added), an additive solution including a polymer additive and a liquid carrier. The additive solution may be less than 5% by weight of the powder mixture, such that the powder mixture may remain a dry powder despite the relatively small amount of liquid that is added. For example, the final powder mixture, including the dry electrolyte powder, the fibrillizable binder, and the additive solution, may have total solid contents greater than 95% by weight. The polymer additive may be the same as that described above. It is noted that the conductive paste described above would generally not be used when preparing a powder mixture for an electrolyte film since conductivity is typically not desired in the solid electrolyte.

With the powder mixture having been prepared, including the dry electrolyte powder, any additive solution for lubricating the dry electrolyte powder, and the fibrillizable binder, the operational flow of FIG. 6 may continue with activating the fibrillizable binder by one or more activation methods. Namely, the operational flow of FIG. 6 may include a solvent activation step 620 that is the same as the solvent activation step 520 of FIG. 5 and/or a temperature activation step 630 that is the same as the temperature activation step 530 of FIG. 5. In this way, the fibrillizable binder may be chemically and/or thermally activated so that it softens and becomes able to stretch longer and finer without breaking, thus improving its adhesion strength. In a case where both the solvent activation step 620 and the temperature activation step 630 are used, the two steps may proceed in either order. The operational flow of FIG. 6 may continue with fibrillizing the binder in the powder mixture by subjecting the powder mixture to a shear force (step 640), which may be the same as step 540 of FIG. 5. If a solvent is added in a solvent activation step 620 to chemically activate the binder, the solvent may in some cases be injected into the powder mixture while the powder mixture is being subjected to the shear force in step 640. Thus, steps 620 and 640 can be performed in a single step.

After the mixture has been subjected to the shear force, the operational flow of FIG. 6 may conclude with a step 650 of pressing the mixture to produce a free-standing film, which may be performed in the same way as step 550 of FIG. 5, for example. The resulting free-standing electrolyte film may comprise at least one type of fibrillizable binder and at least one type of dry electrolyte powder in an amount 80-97% of the free-standing electrolyte film. Such a free-standing electrolyte film may subsequently be laminated on an electrode film (either a cathode or an anode) to produce a solid-state battery or an intermediate product thereof (such as an electrode block of a multi-layer solid-state battery). Like the operational flows of FIGS. 3 and 4, the operational flow of FIG. 6 may be used in combination with the operational flow of FIG. 5 to produce a solid-state electrode block or solid-state battery by an entirely dry method from start to finish. In this way, the long drying times and degraded battery performance associated with conventional wet methods may likewise be completely avoided, resulting in more practical and efficient solid-state battery manufacture.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing an electrode film for a solid-state battery, the method comprising:
   preparing a powder mixture including at least one type of electrode active material, at least one type of fibrillizable binder including polytetrafluoroethylene (PTFE), and at least one type of dry electrolyte powder, the at least one type of dry electrolyte powder being 5-30% of the powder mixture by weight;
   adding a solvent to the powder mixture to activate at least the PTFE of the at least one type of fibrillizable binder, the solvent being selected from the group consisting of hydrocarbons, acetates, alcohols, glycols, acetone, dimethyl carbonate (DMC), diethylcarbamazine (DEC), and tetrachloroethylene;
   fibrillizing at least the PTFE of the at least one type of fibrillizable binder in the powder mixture by subjecting the powder mixture to a shear force;
   prior to said fibrillizing, heating the powder mixture to 70° C. or higher to activate at least the PTFE of the at least one type of fibrillizable binder; and
   pressing the powder mixture into a free-standing film.

2. The method of claim 1, wherein said adding is performed prior to said fibrillizing.

3. The method of claim 1, wherein the powder mixture further includes an additive solution including a polymer additive and a liquid carrier, the additive solution being less than 5% by weight of the powder mixture.

4. The method of claim 1, wherein the powder mixture further includes a conductive paste including a polymer additive, a liquid carrier, and a conductive material, the conductive paste being less than 5% by weight of the powder mixture.

5. The method of claim 1, wherein said adding is performed during said fibrillizing.

6. A method of manufacturing an electrode block for a solid-state battery, the method comprising:
   the method of claim 1;
   providing the free-standing film as an electrode film with a current collector on a first side of the electrode film;
   coating a layer of dry electrolyte powder on a second side of the electrode film opposite the first side; and
   pressing the dry electrolyte powder coated on the electrode film to produce a solid electrolyte layer on the electrode film.

7. A method of manufacturing a solid-state battery, the method comprising:
   the method of claim 1;
   providing the free-standing film as a first electrode film having a first side and a second side opposite the first side;
   providing a second electrode film having a first side and a second side opposite the first side;
   coating the second side of the first electrode film with a layer of dry electrolyte powder;
   placing the second side of the second electrode film on the layer of dry electrolyte powder; and
   pressing the first electrode film having the layer of dry electrolyte powder coated thereon together with the second electrode film to produce a solid-state battery including the first electrode film, the second electrode film, and a solid electrolyte layer therebetween.

8. The method of claim 7, wherein said providing the second electrode film comprises:
   preparing a powder mixture including at least one type of electrode active material and at least one type of fibrillizable binder;
   fibrillizing the at least one type of fibrillizable binder in the powder mixture by subjecting the powder mixture to a shear force; and
   pressing the powder mixture into a free-standing film.

9. The method of claim 8, wherein the powder mixture further includes at least one type of dry electrolyte powder.

10. The method of claim 7, further comprising:
    laminating the first electrode film on a first current collector with the first current collector being on the first side of the first electrode film; and
    laminating the second electrode film on a second current collector with the second current collector being on the first side of the second electrode film.

11. The method of claim 10, wherein said laminating the first electrode film and said laminating the second electrode film are performed prior to said coating.

12. The method of claim 10, wherein said laminating the first electrode film and said laminating the second electrode film are performed after said pressing.

* * * * *